United States Patent
Buscemi et al.

(10) Patent No.: US 10,735,889 B1
(45) Date of Patent: Aug. 4, 2020

(54) METHODS AND APPARATUS FOR SUPPORTING SCHOOL OPERATIONS USING WIRELESS SIGNALS

(71) Applicant: CECELUMEN, LLC, Camarillo, CA (US)

(72) Inventors: James S. Buscemi, Camarillo, CA (US); Jim Webster, Manhattan Beach, CA (US)

(73) Assignee: CECELUMEN, LLC, Camarillo, CA (US)

( * ) Notice: Subject to any disclaimer, the term of this patent is extended or adjusted under 35 U.S.C. 154(b) by 0 days.

(21) Appl. No.: 15/264,526

(22) Filed: Sep. 13, 2016

Related U.S. Application Data

(60) Provisional application No. 62/217,956, filed on Sep. 13, 2015.

(51) Int. Cl.
| | |
|---|---|
| *H04W 24/00* | (2009.01) |
| *H04W 4/021* | (2018.01) |
| *G09B 5/12* | (2006.01) |
| *H04W 4/80* | (2018.01) |

(52) U.S. Cl.
CPC ............ *H04W 4/021* (2013.01); *G09B 5/125* (2013.01); *H04W 4/80* (2018.02)

(58) Field of Classification Search
None
See application file for complete search history.

(56) References Cited

U.S. PATENT DOCUMENTS

| | | |
|---|---|---|
| 2007/0081477 A1 | 4/2007 | Jakkahalli |
| 2008/0130595 A1 | 6/2008 | Abdel-Kader |
| 2009/0011743 A1 | 1/2009 | Johanson et al. |
| 2009/0279492 A1 | 11/2009 | Montemurro et al. |
| 2011/0047603 A1 | 2/2011 | Gordon et al. |
| 2012/0084773 A1 | 4/2012 | Lee et al. |
| 2012/0196535 A1 | 8/2012 | Jarosch et al. |
| 2012/0202185 A1* | 8/2012 | Jabara ..................... G09B 5/00 434/350 |
| 2013/0124309 A1 | 5/2013 | Traasdahl et al. |
| 2013/0128811 A1 | 5/2013 | Bradish et al. |
| 2014/0181245 A1 | 6/2014 | Richardson et al. |
| 2014/0194153 A1 | 7/2014 | Salkintzis |

(Continued)

*Primary Examiner* — Suhail Khan
(74) *Attorney, Agent, or Firm* — Straub & Straub; Michael P. Straub; Stephen T. Straub

(57) ABSTRACT

Methods and apparatus for using wireless networks to support a variety of school related operations including attendance record keeping, student class work assignment receipt and student test answer result receipt are described. Short range wireless signals transmitted in an area corresponding to a class session are used to facilitate verification of a student's presence in the class. Students submit attendance messages, test answer messages and/or work corresponding to an assignment wirelessly with the submission message or attendance message including information from a short range wireless signal received by the student device along with student authentication information such as a captured image or fingerprint obtained from the student at the time of submission or attendance message transmission. Based on the information in a received message the network node authenticates the student and that it was submitted from the area of the class. Records are updated based on received message content.

18 Claims, 10 Drawing Sheets

(56) References Cited

U.S. PATENT DOCUMENTS

| | | | |
|---|---|---|---|
| 2015/0339948 A1 | 11/2015 | Wood et al. | |
| 2016/0163212 A1* | 6/2016 | Stuckey | G09B 7/02 434/309 |
| 2016/0381210 A1* | 12/2016 | Kenjalkar | H04M 1/72577 455/419 |
| 2017/0118306 A1 | 4/2017 | Madhvanath et al. | |

* cited by examiner

METHODS AND APPARATUS FOR SUPPORTING SCHOOL OPERATIONS USING WIRELESS SIGNALS

RELATED APPLICATIONS

The present application claims the benefit of U.S. Provisional Patent Application Ser. No. 62/217,956 filed Sep. 13, 2015 which is hereby expressly incorporated by reference in its entirety.

FIELD

The present application relates to methods and apparatus for using wireless signals to support school related operations, e.g., attendance, test and student work assignment related operations.

BACKGROUND

Many colleges, high schools and other educational facilities have installed Wi-Fi and/or other wireless systems, including a large number of access points, to allow students to wirelessly access a school computer network and/or the Internet from their classrooms, dorms or other sites on campus. Some schools, including many colleges, require students to purchase laptops or other wireless devices for accessing the school network.

While in colleges, laptop computers with wireless capabilities may be common for students, even students who don't normally carry a laptop computer routinely carry a cell phone with wireless network capabilities.

While students often use their cell phones and/or other devices to obtain general information about their school or to access particular school systems, teachers are still left in many cases with the task of manually tracking class attendance, manually accepting test results of tests taken during class, and collecting work assignments which were due to be submitted prior to or at the end of a particular class session.

Class attendance is of particular concern, along with test result submission which is to occur during a class session. This is because both class attendance and test results can significantly affect a student's ability to obtain credit for a class. Furthermore, to receive credit for class attendance and in class tests, physical presence of the student is normally required. Physical presence of the student is normally confirmed by the teacher creating the attendance record, and/or accepting the tests results. While physical involvement and tracking of attendance and/or test result submissions during a class normally requires involvement of a teacher or another school administrator it would be desirable if at least some of the attendance and/or student in class submission functions could be automated, and implemented in and electronic form. This should occur without necessarily losing the ability to confirm that the submission transpired during class, and that the student was physically present to make the submission or receive attendance credit.

SUMMARY

Methods and apparatus for tracking class attendance and/or other class or student related information are described. The methods and apparatus use wireless signals, e.g., Wi-Fi signals, or other short range Bluetooth Low Energy (BLE) signals via BLE beacon, which are transmitted in an area corresponding to a class session. By relying on short range wireless signals in the area corresponding to a class session, student presence in the class can be reliably detected and tracked. Similarly, test and/or work assignment submission can be constrained to submissions made during a time period corresponding to a class session.

In various embodiments, a teacher configures a class record to include student information. The information may include specific data identifying students who are to participate in the class to which the record relates. The teacher and/or another school administrator also configure the class record to include information on the schedule of class sessions, and depending on the embodiment, where the sessions are to be held, e.g., in terms of class room number. Information associating beacon or other short range wireless signals with the class sessions is stored, e.g., with the network device thus having knowledge of at least some wireless signal information which can be one or more WI-Fi beacon identifiers, which will be transmitted to student devices in the area of a scheduled class session via BLE beacon. The information may indicate beacon IDs or other signals transmitted during a time period corresponding to a class session, covering the area of a class session; or may include information transmitted by the teacher's device during the time period corresponding to the class session. For example, the teacher's device may transmit information in the form of a secure class ID which may be time dependent, e.g., change from one session to the next. Such information can, and in some embodiments is received and used, as evidence of presence in the area of the class when student devices report receipt of the transmitted information in a timely manner, e.g., as part of an attendance message sent from the student device to the network device, e.g., school server.

Thus at least in some embodiments, the proximal nature of Wi-Fi or other signals with a limited range is leveraged to provide a degree of security with regard to the collection and creation of class attendance records and/or student submissions to be made during a time period corresponding to a class session.

In some embodiments student devices with wireless capability, e.g., a student cell phone, tablet, or lap top computer are loaded with an application which supports various school related functions including attendance functions, test submissions, independent work submissions, etc. The application may run in a browser and rely on WiFi or other wireless network connectivity for communicating with a network device, e.g., a school server, via a wireless access point, e.g., of a school network. The access point may be a Wi-Fi access point covering the location of a class session.

In some such embodiments an administrator system, e.g., a teacher's laptop or the access point covering an area where a class session is to take place, transmits a locally detectable wireless BLE signal, e.g., a BLE beacon signal communicating information to the student devices such as a beacon ID or secure, e.g., time dependent, class identifier. The student devices, via their wireless interfaces receive the information communicated to them while in the area of the class session. The application on the student device, responsible for signaling student presence in a class for a class session, transmits to the network device at least some information communicated in the received wireless signal as evidence of physical presence in the area corresponding to the class session. Also included in the communication is student authentication information. The authentication information may be biometric information captured by a thumb or other finger scan, or some other authentication information such as an image of the student captured by the student's device during the time associated with a class session. The communication from the student device may be electronically signed, so that the network device can verify that the transmission from the student's device was not altered during transmission over the school or other network.

The time of the student's transmission to the network device, as indicated by the time of receipt at the network device and/or a time stamp in the transmission, the student authentication information in combination with the information, e.g., beacon information or secure class identifier, received from the administrative device serves as verifiable evidence of the students presence during a class session to which the student transmission corresponds.

In some embodiments the network device receives the student's message, e.g., attendance message, verifies that the time, information from the wireless signal and student authentication information match what is expected, and then updates attendance records corresponding to the class and student associated with the student device to which the message was received and the class session to which the transmission relates.

Students may submit work assignments and/or test results during time periods corresponding to a class, or time periods which are set by a teacher and stored in the network device. The submission message may include a timestamp, and/or personal authentication information, e.g., fingerprint or image captured by the student device at the time of submission, corresponding to the student and/or information transmitted by an administrator device in an area corresponding to a class session during the time period corresponding to the class session, e.g., the time of the class.

While in some embodiments student devices are used to wirelessly transmit attendance messages to the network device for attendance purposes, in other embodiments the students devices may transmit one or more wireless signals to an administrator system. The wireless signals may be, and sometimes are, Wi-Fi beacon signals and/or attendance messages. The signals which may be attendance messages may include information which is the same or similar to that included in an attendance message transmitted from the student system to the network device but may, and sometimes do, omit information received in a wireless signal from an administrator device. The administrator system time stamps and relays the received signals and/or messages to the network device. Since the administrator system in the class receives the signals and/or messages from the student devices, the receipt by the administrative system, e.g., teacher's laptop, in the area of the class serves as proof that the signal was transmitted in the area corresponding to a class session. The identity of the student can be confirmed from authentication information, e.g., fingerprint and/or image, transmitted in the message to the administrative device and which is relayed to the network device, e.g., school server, for processing.

Student attendance records are automatically updated based on the received signals. Student records automatically are updated to show, for each class to which a student is assigned, attendance information allowing a student to easily see their attendance record, e.g., sessions, the student has missed and the total number of missed days for a particular class.

The network device also stores student submissions, e.g., test answers and work assignments. The teacher can enter the grades for the submitted test answers and work assignments with the corresponding student records being updated automatically by network device. Thus students can easily see attendance and grading information from their wireless deices as well as make submissions via such devices.

While students have access to their records for individual classes in which they participate, teachers have access to the records for a class in which they teach. Thus the teacher has access from their laptop or other wireless device to track attendance, independent work submissions, and in-class work and/or test submissions for the students of the classes the teacher teaches.

By using WiFi and/or short range BLE signals and the information communicated therein, evidence of being within an area corresponding to a class at a particular time can be collected and used for a variety of school related purposes, including automating class attendance record keeping.

Numerous variations benefits and embodiments are discussed in the detailed description which follows.

DETAILED DESCRIPTION

Figure 1:
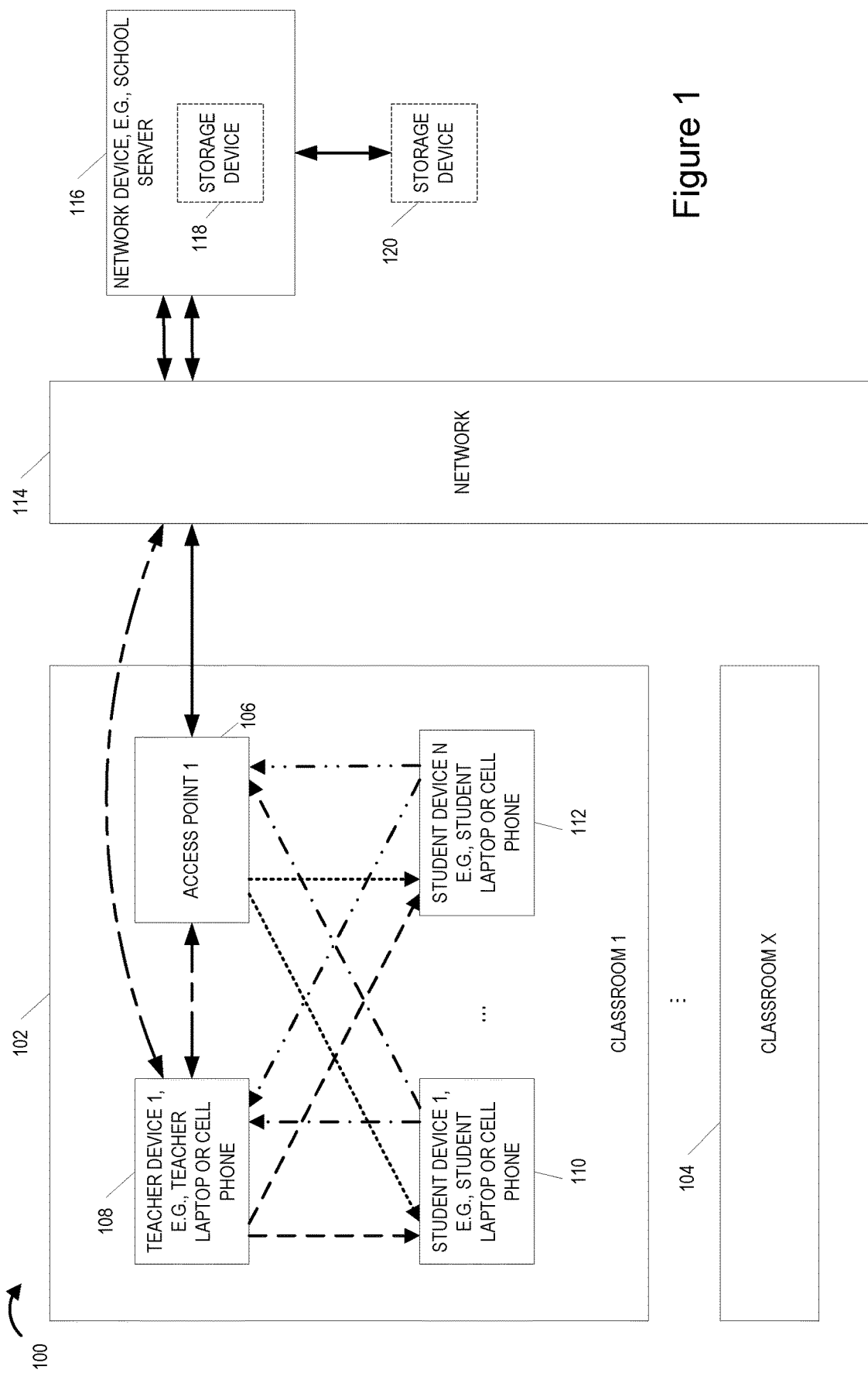
FIG. 1 illustrates an exemplary communications system, e.g., a communications system at a school, corresponding to one exemplary embodiment.

FIG. 1 is a drawing of an exemplary communications system 100 in accordance with an exemplary embodiment. In exemplary system 100 there are a plurality of classrooms (classroom 1 102, . . . , classroom X 104), and each classroom includes an access point. For example classroom 102 includes access point 1 106. In various embodiments, the access point, e.g., access point 1 106, is located at a predetermined known location in the classroom and its coverage area encompasses the area of the classroom in which a teacher or student, with a wireless device, may be located. At different times a particular teacher and/or a set of students, each with a wireless communications device, may be, and sometimes are, in a particular classroom, e.g., corresponding to a scheduled class session. As shown in FIG. 1, classroom 1 102 includes teacher device 1, e.g., a teacher laptop or mobile device, access point 1 106, and a plurality of student devices (student device 1, e.g., a student laptop or mobile device, . . . , student device N, e.g., a student laptop or mobile device). Communications system 100 further includes a network 114, and a network device 116, e.g., a school server. In some embodiments, the network device 116 includes a storage device 118. In some embodiments, communications system 100 includes a storage device 1020 which is accessible to the network device 116.

The student devices (110, . . . , 112) communicate with the teacher device 108 and/or the access point 1 106 via wireless signaling. The teacher device 108 and/or the access point 108 communicates with the network device 116 via network 114, e.g., an infrastructure network which may included wired and/or wireless communications paths. In various embodiments, student devices (110, . . . , 112) communicate with the server 116 via teacher device 108 and/or access point 1 106 and network 114.

Communications system 100 is used to communicate attendance related information, e.g., take attendance of a classroom session, communication work submission related information, and communicate test related information. In some embodiments, the teacher device 1 108 and/or the access point 106 transmits beacons during a class session, e.g., to initiate an attendance check, which are detected by student devices in the classroom 1 102. In some embodiments, the student devices (110, . . . , 112) transmit signals, during a class session, which are detected by teacher device 108 and/or access point 106, e.g., as part of attendance. In some embodiments, the teacher device 108 and/or the access point 1 106 are administrator devices, e.g., with a different level of access with regard to network device 116 and stored information accessible by network device 116.

Figures 2, 2A, 2B, 2C:
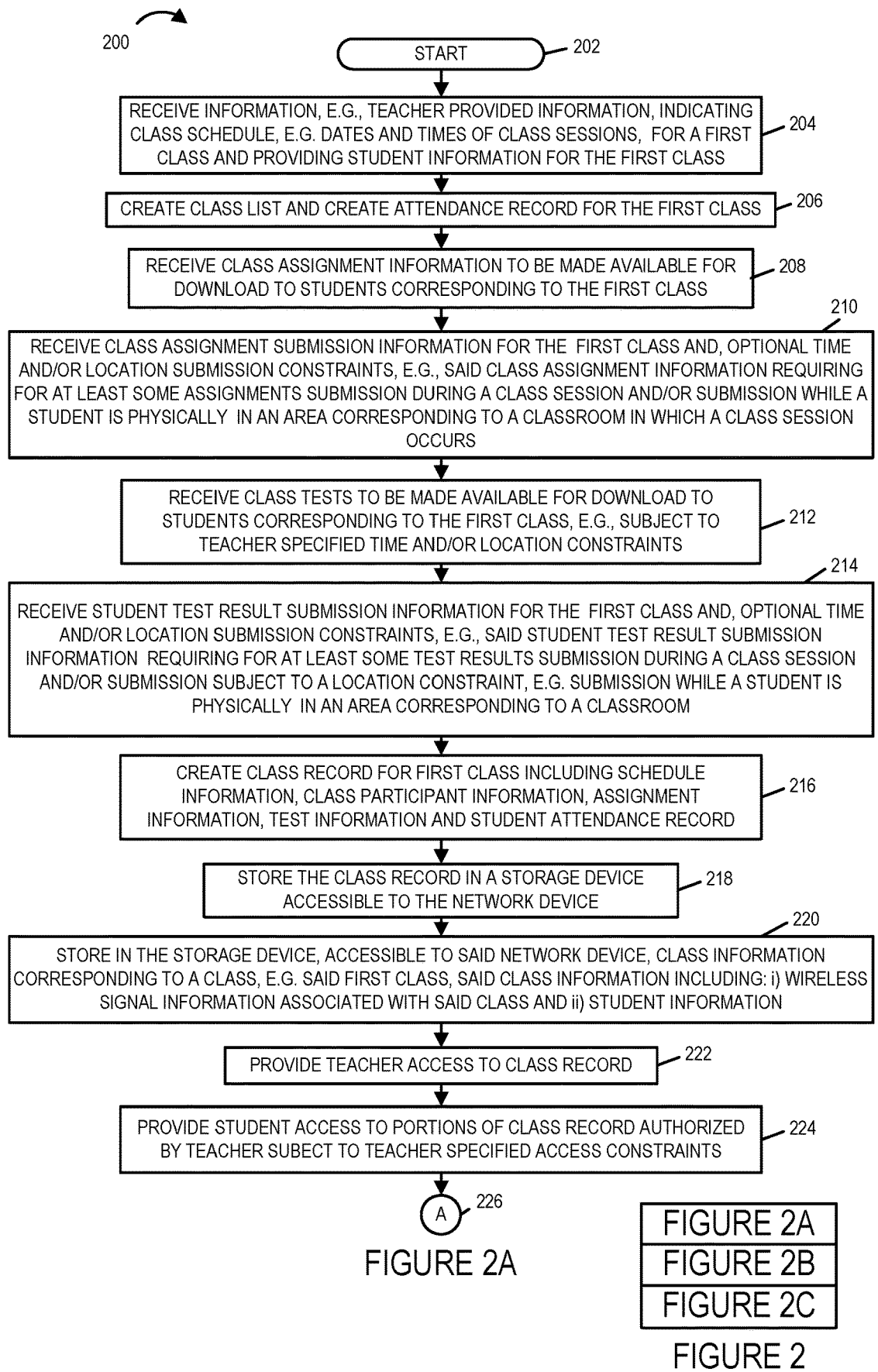
FIG. 2A is a first part of a flowchart showing exemplary steps of a method which may be implemented in the system of FIG. 1.
FIG. 2B is a second part of a flow chart showing exemplary steps of a method which may be implemented in the system of FIG. 1.
FIG. 2C is a third part of a flowchart showing exemplary steps of a method which may be implemented in the system of FIG. 1.
FIG. 2, which comprises the combination of FIGS. 2 A, 2B and 2C, shows the steps of a method implemented in accordance with one embodiment.
Figure 2B:
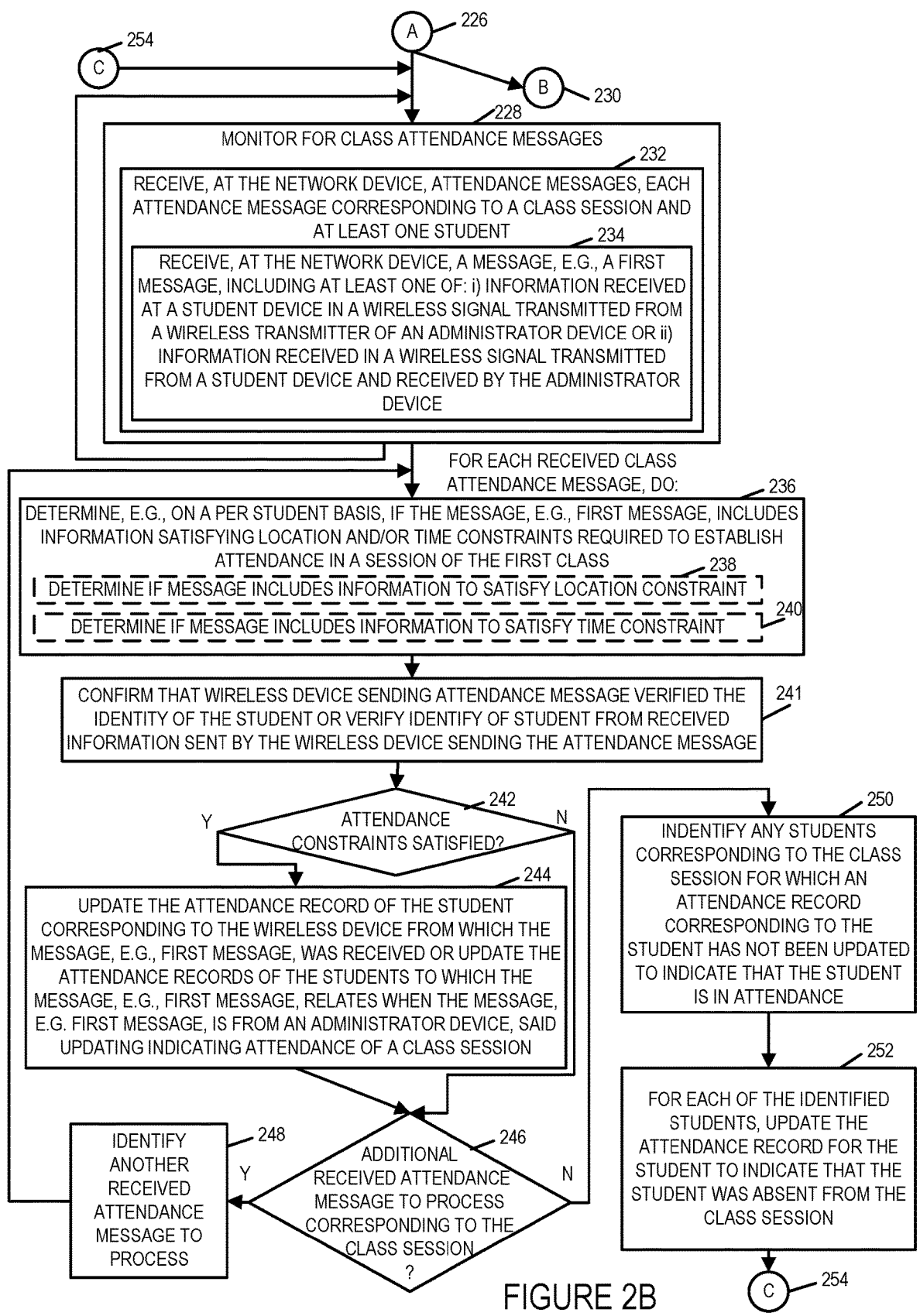
Figure 2C:
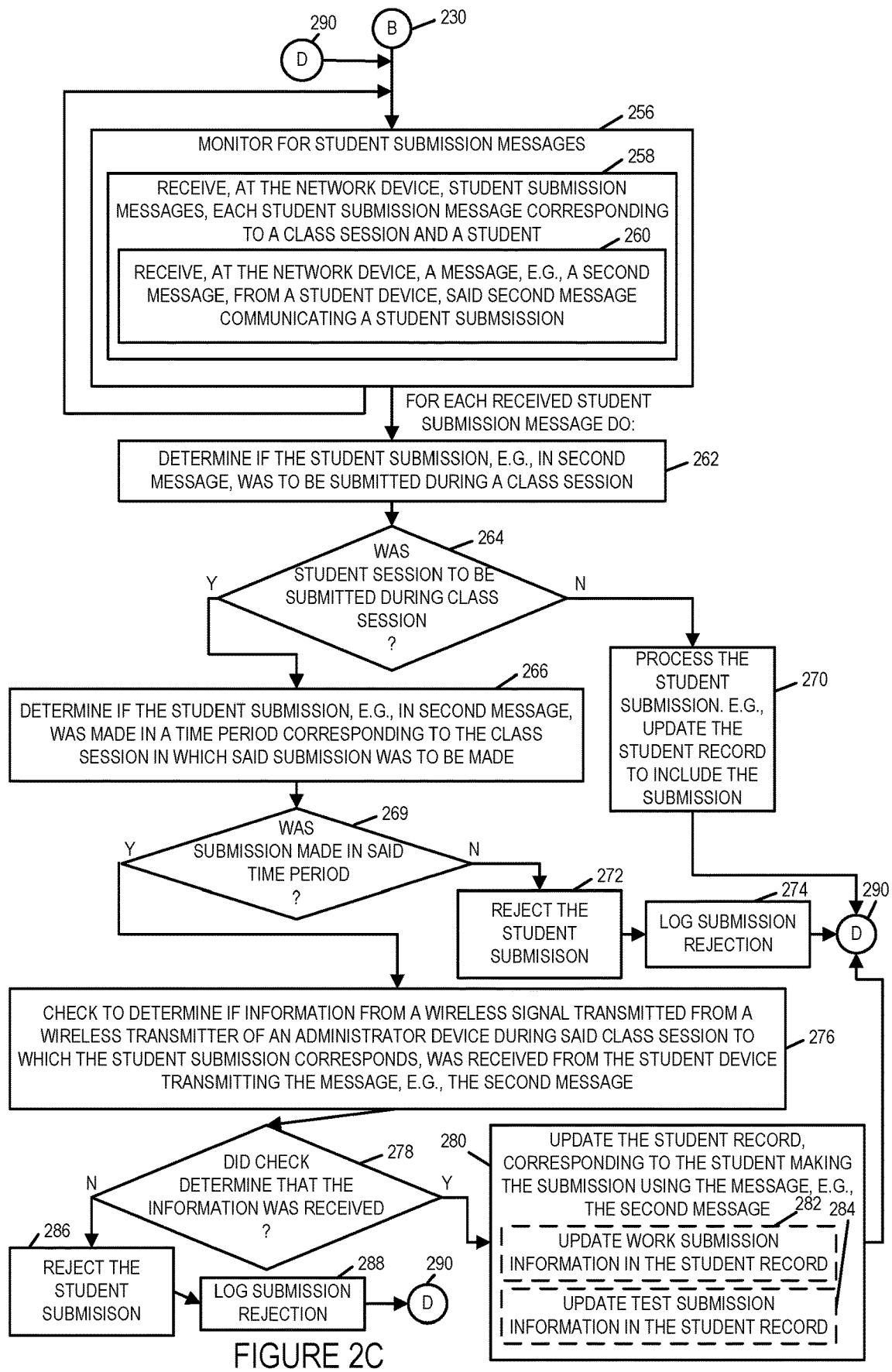

FIG. 2, comprising the combination of FIG. 2A, FIG. 2B and FIG. 2C, is a flowchart 200 of an exemplary method in accordance with an exemplary embodiment, e.g., an exemplary method of operating a network device, e.g. network device 1016, in accordance with an exemplary embodiment. Operation of the exemplary method starts in step 202 in which the network device is powered on and initialized. Operation proceeds from step 202 to step 204. In step 204 the network device receives information, e.g., teacher provided information, indicating a class schedule, e.g., dates and times of class sessions, for a first class and providing student information for the first class. Operation proceeds from step 204 to step 206.

In step 206 the network device creates a class list and creates an attendance record for the first class. Operation proceeds from step 206 to step 208. In step 208 the network device receives class assignment information, e.g., teacher provided class assignment information, to be made available for download to students corresponding to the first class. Operation proceeds from step 208 to step 210.

In step 210 the network device receives class assignment submission information for the first class and, optional time and/or location submission constraints, e.g., said class assignment information requiring for at least some assignment submission during a class session and or submission while a student is physically in an area corresponding to a classroom in which a class session occurs. For example, the class assignment submission information includes class assignment submission information for a first work assignment which includes a first set of problems to be solved, information indicating that the first work assignment is to be submitted during the first 5 minutes of the second class session from a location within the classroom in which the second class session is scheduled, and is to be submitted by the student who is attending the class and should include specific requested information to authenticate the student. Operation proceeds from step 210 to step 212.

In step 212, the network device receives class tests to be made available for download to students corresponding to the first class, e.g., subject to teacher specified time and/or location constraints. For example, class tests received include, e.g., a mid-term exam corresponding to the first class, which can be downloaded on class session corresponding to the scheduled mid-term during the class session in the classroom in which the mid-term is located by students registered for the first class. Operation proceeds from step 212 to step 214.

In step 214, the network device receives student test result submission information for the first class and, optional time and/or location submission constraints, e.g., said student test result submission information requiring for at least some test results submission during a class session and/or submission subject to a location restraint, e.g., submission while a student is physically in an area corresponding to a classroom. Operation proceeds from step 214 to step 216. In step 216 the network device creates a class record for the first class including schedule information, class participant information, assignment information, test information and a student attendance record. Operation proceeds from step 216 to step 218.

In step 218 the network device stores the class record in a storage device accessible to the network device. For example, network device 116 stores the class record for class 1 in storage device 118, e.g., memory, located in network device 116, or in storage device 120, which is accessible to network device 116 but external to network device 116. Operation proceeds from step 218 to step 220.

In step 220 the network device stores in the storage device, accessible to said network device, class information corresponding to a class, e.g., said first class, said class information including wireless signal information associated with said class and ii) student information. In some embodiments, the wireless signal information includes per student wireless signal identification information, said per student wireless signal identification information including for at least a first student: first student wireless signal identification information which includes information, e.g., a beacon ID for student 1, that can be used to identify a wireless signal transmitted by a first student device, e.g., a student laptop of cell phone, corresponding to the first student. In some embodiments, the student information includes per student information for at least a first student: including first student identification information corresponding to the said first student for which first student wireless signal identification information is stored, e.g., one student name or identifier for each student, said student identification information including at least a first student name or first student identifier corresponding to the first student. In some embodiments, the per student information for the first student further includes first student authentication information for authenticating at least one of the first student identification information communicated via the first student's wireless device and/or first student submissions communicated via the first student's wireless device. Operation proceeds from step 220 to step 222.

In step 222 the network device provides teacher access to the class record. Operation proceeds from step 222 to step 224, in which the network device provides student access to portions of the class record authorized by the teacher subject to teacher specified access constraints. Operation proceeds from step 224, via connecting node A 226, to step 228 and, via connecting node B 230, to step 256.

In step 228 the network device monitors for class attendance messages. Step 228 includes step 232 in which the network device receives, at the network device, attendance messages, each attendance message corresponding to a class session and at least one student. In some embodiments, the network device receives an individual received attendance message corresponding to each student which is present, e.g., an attendance message being sourced from an individual student. In some other embodiments, the network device receives an aggregated attendance message corresponding to a class session, e.g., with the aggregation of student presence information being performed by an administrator device, e.g., a teacher's communications device or an access point.

Step 232 includes step 234 in which the network device receives, at the network device, a message, e.g. a first message, including at least one of: i) information received at a student device in a wireless signal transmitted from a wireless transmitter or an administrator device or ii) information received in a wireless signal transmitted from a student device and received by the administrator device.

In some embodiments, the first message is a class attendance message from a first student device, and said first message includes at least a portion of information, e.g., a beacon id corresponding to and transmitted by the access point in the classroom or a beacon id corresponding to and transmitted by the teacher device of the teacher of the class, included in the wireless signal received by the first student device.

In some embodiments, the first message is administrator device generated class attendance message, which is a forwarded version of a received class attendance message from a first student device.

In some embodiments, the first message is an administrator device generated class attendance message including information received in a wireless signal transmitted from the first student device and received by the administrator device. In some embodiments, the first message is an administrator device generated class attendance message including information received in a wireless signal transmitted from the first student device and received by the administrator device, and further including information received in a wireless signal transmitted from a second student device and received by the administrator device, e.g., the administrator generated attendance message aggregates received information from multiple students.

In some embodiments, the administrator device is one of an access point corresponding to a classroom where said class is conducted of a teacher device of said class, wherein said teacher device is a wireless device. In some such embodiments, the teacher device is one of a cell phone or laptop.

With regard to the information received at a student device in a wireless signal transmitted from a wireless transmitter or an administrator device, in one example, in an exemplary embodiment, a message may be sent from a student device, and the message includes wireless signal information that was received by the student device while the student device was in class, and the wireless signal information that was received by the student device while in class includes, e.g., a beacon id or other beacon information which is being transmitted by an administrator device, e.g., a teacher device such as a teacher laptop computer or a teacher cell phone, or an access point associated with the class, e.g., an access point located in the classroom in which the class session is scheduled.

With regard to the information received in a wireless signal transmitted from a student device and received by the administrator device, in another example, in an exemplary embodiment, student devices, e.g., student cell phones or laptops may transmit beacons or other signals which are transmitted to administrator device, e.g. the teacher device or access point associated with a class, and are reported to the network device by administrator device, e.g., the teacher device or AP associated with the class.

Operation proceeds from step 228 to step 236. In step 236 the network device determines, e.g., on a per student basis, if the message, e.g., the first message, includes information satisfying location and/or time constraints required to establish attendance in a session of the first class. For example, the network device checks the first message to determine if the first message includes information received during a time window corresponding to a class session of the first class and checks to determine that the first message was received in an area corresponding to the first class. For example, the network device checks that the first message includes information that was transmitted and received during a time window corresponding to the first class and which was transmitted by the teacher's device or an AP corresponding to the first class thus indicating that the signal was received in the proximity of the first class. In this way both time both time and location constraints are tested to determine if both the time and location constraints are satisfied.

Step 236 includes step 238 and/or step 240. In step 238 the network device determines if the message, e.g., the first message, includes information to satisfy the location constraint. For example, does the first message include information indicating that a first student, which is registered for the first class was physically located within the classroom corresponding to the first session of the first class. In step 240 the network device determines if the message, e.g., the first message, includes information to satisfy the time constraint. For example, does the first message include information indicating that a first student, which is registered for the first class was physically located within the classroom corresponding to the first session of the first class during the scheduled date of the first session of the first class during the time of the scheduled first session of the first class. In some embodiments, the time check corresponding to a short interval during the first session, e.g., the first two minutes of the first session of the first class. In some embodiments, as part of the time check the student in the first class performs one or more predetermined authentication operations during the predetermined time interval, e.g., enters an ID number, a password, inputs biometric information, e.g., a thumbprint, a face photo, etc. In some embodiments, the time interval is intentionally short enough to make it difficult or not possible for a single person to enter attendance information on two devices corresponding to two students. In some embodiments, attendance checks are taken at multiple times in a session, e.g., at the beginning and at the end. In some embodiments, attendance checks are performed at random or pseudo-random times during a class session. In some embodiments, the number of attendance checks performed during a session varies, e.g., with a random or pseudo-random number of checks being performed per session.

Operation proceeds from step 236 to step 241 wherein a student identity check is made. In step 241, the network device determines if the wireless device sending the attendance message has verified the identity of the student, e.g., based on a fingerprint scan or captured image of the student or some other check, e.g., using stored information in the student device or supplied to the student device from the network node or, in the case where the wireless device sending the message did not check and confirm the student's identity before sending the message verifies the identify of the student form information sent to the network node from the wireless device sending the attendance message. In some embodiments the wireless device sends, either with the attendance message or in a separate message information which can be used to confirm the identity of the student corresponding to the wireless terminal and the received information is checked instep 241. For example, the network device, e.g., network node implementing the method of FIG. 2, may receive a captured image or fingerprint scan of the student and check it against an image or fingerprint scan stored in the network node to make sure it matches the student whose attendance is being updated by the attendance message. Thus, the identify check maybe performed in the wireless device sending the attendance message or in the network node implementing the method shown in FIG. 2 with the check being based, at least in some embodiments, on biometric information captured by the wireless device sending the attendance message.

In step 242 if the attendance constrains were determined to be satisfied, e.g., based on the information in the received first message or sent with the first message, then operation proceeds from step 242 to step 244; otherwise, operation proceeds from step 242 to step 246. For example, if any time, location or identify checks preformed in steps 236 or 241 fail, e.g., operation proceeds to step 246 without the attendance record of the student corresponding to the wireless device being updated. However if the checks were satisfied operation proceeds to step 244. In some embodiments, when a check associated with an attendance message fails the message is logged as well as the reason for the failure, e.g., time, location or identity check not being satisfied. The teacher and/or student maybe and sometimes is notified of the failure via a real time wireless message during the class allowing the attendance issue to be checked and resolved by the teacher and/or student before the class session is over or immediately after the class session allowing for reliable attendance records even where hardware or other issues may have resulted in a failure to automatically update an attendance record properly. The notification of failures also allows a teacher to quickly become aware of attempts defeat identify checks, etc. allowing a teacher to identify an imposter who may have attempted to replace a student to take a test or for some other reason.

In step 244, which is performed when the checks relating to an attendance message were passed, the network device updates the attendance record of the student corresponding to the wireless device from the message, e.g., first message was received or updates the attendance records of the student to which the first message, e.g. first message, relates when the message, e.g., first message, is from an administrator device, said updating indicating attendance of a class session for a student whose received information is determined to satisfy the constraints. Operation proceeds from step 244 to step 246.

In step 246 the network device checks if there is additional received attendance message to process corresponding to the class session. If the network device determines that there is an additional received attendance message to process corresponding to the class session, then operation proceeds from step 246 to step 248, in which the network device identifies another received attendance message to process. Operation proceeds from step 248 to step 236.

Returning to step 246, if the network device determines that there is an additional received attendance message to process corresponding to the class session, then operation proceeds from step 246 to step 250, in which the network device identifies any students corresponding to the class session for which an attendance record corresponding to the student has not been updated to indicate that the student is in attendance. Operation proceeds from step 250 to step 252. In step 252 the network device updates, for each of the identified students of step 250, the attendance record for the student to indicate that the student was absent for the class session. Operation proceeds from step 252, via connecting node C 254 to step 228.

Returning to step 256, in step 256 the network device monitors for student submission messages. Step 256 includes step 258 in which the network device receives at the network device, student submission messages, each student submission message corresponding to a class session and a student. Step 258 includes step 260 in which the network device receives at the network device a message, e.g., a second message, from a student device, said second message communicating a student submission. Operation proceeds from step 256 to step 262.

In step 262 the network device determines if the student submission, e.g., in the second message, was to be submitted during a class session. Operation proceeds from step 262 to step 264. If the determination of step 262 was that the student submission was to be submitted during a class session, then operation proceeds from step 264 to step 266; otherwise, operation proceeds from step 264 to step 270. In step 270 the network device processes the received student submission, e.g., the network device updates the student record to include the received student submission of the received second message. Operation proceeds from step 270 to connecting node D 290.

Returning to step 266, in step 266 the network device determines if the student submission, e.g., in the second message, was made in a time period corresponding to the class session in which said submission was to be made. Operation proceeds from step 266 to step 269. In step 269, if the determination of step 266 was that the submission was made in the time period corresponding to the class session in which said submission was to be made, then operation proceeds from step 269 to step 276; otherwise, operation proceeds from step 269 to step 272 in which the network device rejects the student submission since the student submission was made outside the time period corresponding to the class session in which the submission was to be made. Operation proceeds from step 271 to step 274 in which the network device logs the submission rejection. Operation proceeds from step 274 to connecting node D 290.

Returning to step 276, in step 276 the network device checks to determine if information from a wireless signal transmitted from a wireless transmitter of an administrator device during said class session to which the student submission corresponds, was received from the student device transmitting the message, e.g., the second message. Operation proceeds from step 276 to step 278. In step 278 if the check of step 276 determines that the information from a wireless signal transmitted from a wireless transmitter of an administrator device during said class session to which the student submission corresponds, was received from the student device transmitting the message, e.g., the second message, then operation proceeds from step 278 to step 280 unless an identity check is also to be made in which case step 241 would be performed prior to accepting the submission. If in step 278 it was determined that the information indicating receipt of a signal corresponding to the class area was not received operation proceeds from step 278 to step 286 in which the network device rejects the student submission. Rejection of the submission will also occur in embodiments where an identity authentication check such as the one in step 241 is required before accepting the submission and the identity authentication check fails. Thus in some embodiments acceptance step 288 is conditional on a successful identity authentication which is the same as or similar to that performed in step 241 but before acceptance of a student submission. In the case where a submission is to be rejected, operation proceeds from step 286 to step 288 in which the network device logs the submission rejection. Logging of the submission rejection in some embodiments includes storing of the submission so that it can be reviewed in the future along with information provided with the submission. The teacher and/or student maybe and often is notified of the submission rejection by a message being sent to the teacher and/or student device. Operation proceeds from step 288 to connecting node D 290.

Returning to step 280, in step 280 the network device updates the student record, corresponding to the student making the submission using the message, e.g., the second message after successful completion of the various submission related checks. In various embodiments, the submission is one or a work assignment corresponding to the class session or student test results corresponding to a class test to be taken during the class session. Step 280 includes step 282 or step 284 depending upon the type of student submission. In step 282 the network device updates work submission information in the student record. In step 284 the network device updates test submission information in the student record. Operation proceeds from step 280 to connecting node D 290. Operation proceeds from connecting node D 290 to the input of step 256.

In some embodiments, the per student information for the first student further includes, per student class records including a first student class record for said first class including: student attendance information indicating one or more dates of attendance by the first student in the first class. In some embodiments, said first student class record for said first class further includes: a first student work submission for the first class; and time and date information indicating the time and date the first student work submission was submitted by the first student for the first class. In some embodiments, said first student class record for said first class further includes: a first student work submission for the first class; and time and date information indicating the time and date the first student work submission was submitted by the first student for the first class. In some such embodiments, said first student class record for said first class further includes: a first student test submission for the first class; and time and date information indicating the time and date the first student test submission was submitted by the first student for the first class.

Figure 3:
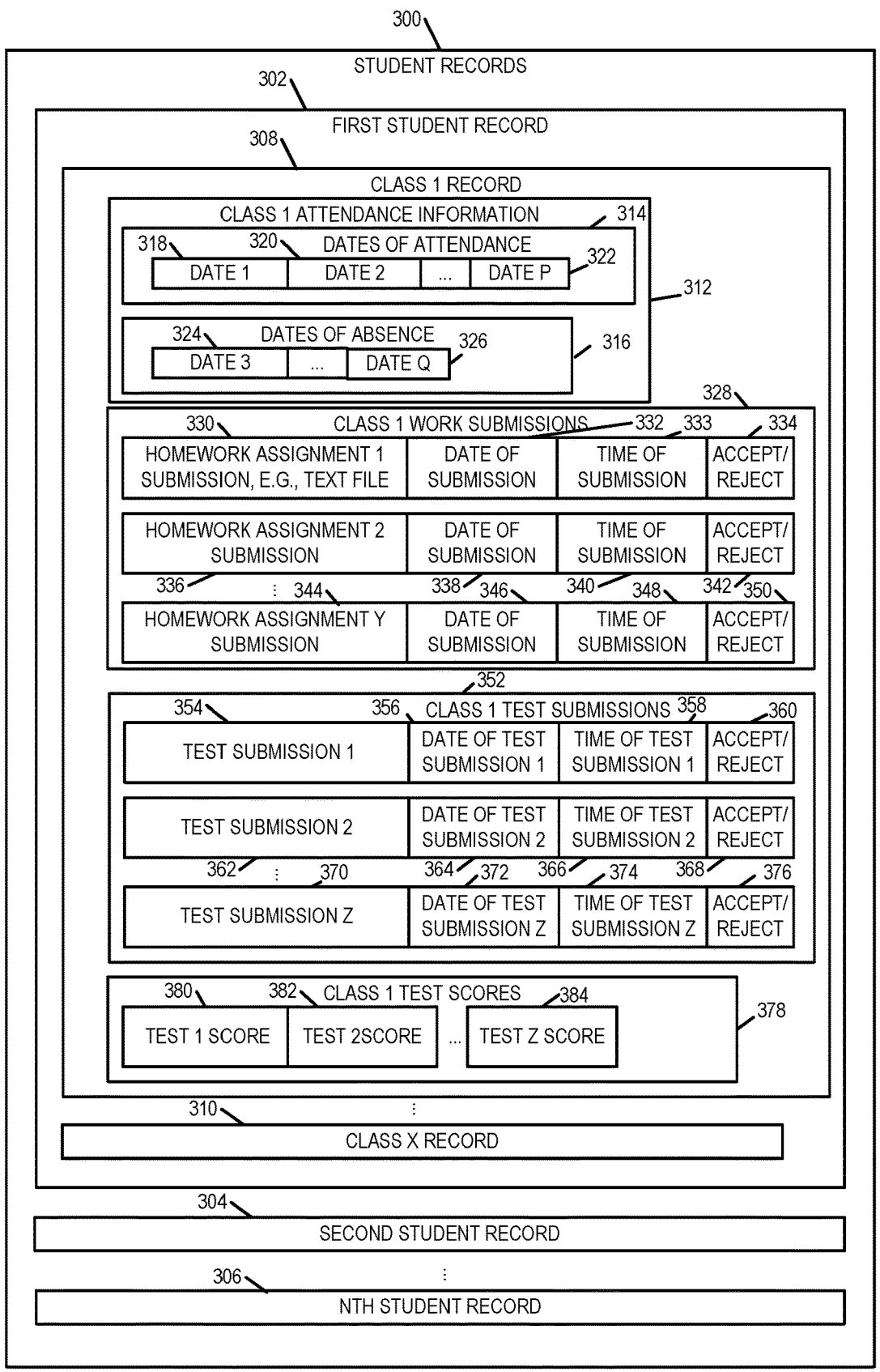
FIG. 3 illustrates exemplary student records which may be stored, accessed and used by the network node, e.g., school server, shown in FIG. 1.

FIG. 3 is a drawing of exemplary student records 300 in accordance with an exemplary embodiment. Exemplary student records 300 includes a plurality of student records (first student record 302, second student record 304, . . . , Nth student record 306). First student record 202 includes a plurality of class records (class 1 record 312, . . . , class X record 310, each class record corresponding to a different class for which the first student is a member, e.g., for which the first student is registered to attend. Class 1 record 308 includes class 1 attendance information 312, class 1 work submissions 328, class 1 test submissions 352, and class 1 test scores 378.

Class 1 attendance information 314 includes recorded dates of attendance 314 and recorded dates of absence 316. Recorded dates of attendance 314 includes date 1 318, date 2 320, . . . , date P 322, where each recorded data of attendance is a date of a class 1 class session in which the first student was determined to be present in the class, e.g., based on received attendance messages. Recorded dates of absence 316 includes date 3 324, . . . , date Q 326, where each recorded data of absence is a date of a class 1 class session in which the first student was determined to be absent from the class, e.g., based on the lack of a received attendance message corresponding to the first student and a session of the first class satisfying attendance acceptance constraints.

Class 1 work submissions 328 includes a plurality of sets of information corresponding to class 1 homework assignments which are submitted by the first student. For example, class 1 work submissions 328 includes homework assignment 1 submission 330, e.g., a text file, the date of submission 332 of homework assignment 1, the time of submission 333 of homework assignment 1, and accept/reject information 334 indicating whether homework assignment 1 is deemed accepted or rejection, e.g., based on submission criteria. For example, an assignment may be deemed rejected for having been submitted on a wrong date and/or time, e.g., the submission was late. In various embodiments, the accept/rejection information 334 further includes a reason for rejection in the event of a rejection and supporting information. Rejected submitted assignments are logged and recorded, e.g., allowing for a subsequent challenge to the rejection, e.g., an initial rejection may be overwritten based on valid accepted excuse. Class 1 work submissions 328 further includes homework assignment 2 submission 336, the date of submission 338 of homework assignment 2, the time of submission 340 of homework assignment 2, and accept/reject information 342 indicating whether homework assignment 2 is deemed accepted or rejection, e.g., based on submission criteria. Class 1 work submissions 328 further includes homework assignment Y submission 344, the date of submission 346 of homework assignment Y, the time of submission 348 of homework assignment Y, and accept/reject information 350 indicating whether homework assignment Y is deemed accepted or rejection, e.g., based on submission criteria. In some embodiments, some homework assignments are required to be submitted during a particular class session and/or during a particular time during the class session.

Class 1 test submissions 352 includes a plurality of sets of information corresponding to class 1 tests which are submitted by the first student. For example, class 1 test submissions 352 includes test submission 1 354, e.g., a file of test 1 first student generated test answers, the date of submission 356 of test submission 1, the time of submission 358 of test submission 1, and accept/reject information 360 indicating whether test submission 1 is deemed accepted or rejected, e.g., based on submission criteria. For example, an assignment may be deemed rejected for having failed one or more of: a submission date check, a submission time range check, a submission location check, e.g., based on reported received beacon signal information being transmitted during the test in the classroom in which the test was scheduled by and administrator device, a submission identity check, e.g., based student identity information and/or student biometrics, used to verify the identify of the student.

Class 1 test submissions 352 further include test submission 2 362, e.g., a file of test 2 first student generated test answers, the date of submission 364 of test submission 2, the time of submission 366 of test submission 2, and accept/reject information 368 indicating whether test submission 2 is deemed accepted or rejected, e.g., based on submission criteria. Class 1 test submissions 352 further includes test submission Z 370, e.g., a file of test Z first student generated test answers, the date of submission 372 of test submission Z, the time of submission 374 of test submission Z, and accept/reject information 376 indicating whether test submission Z is deemed accepted or rejected, e.g., based on submission criteria.

Class 1 test scores 378 includes a plurality of sets of test scores for the first student corresponding to class 1 tests, e.g., which are submitted by a grader, e.g., the class 1 teacher, of the class 1 tests. Class 1 test scores 378 for the first student includes class 1 test 1 score 380, class 1 test 2 score 382 and class 1 test Z score 384.

Figure 4:
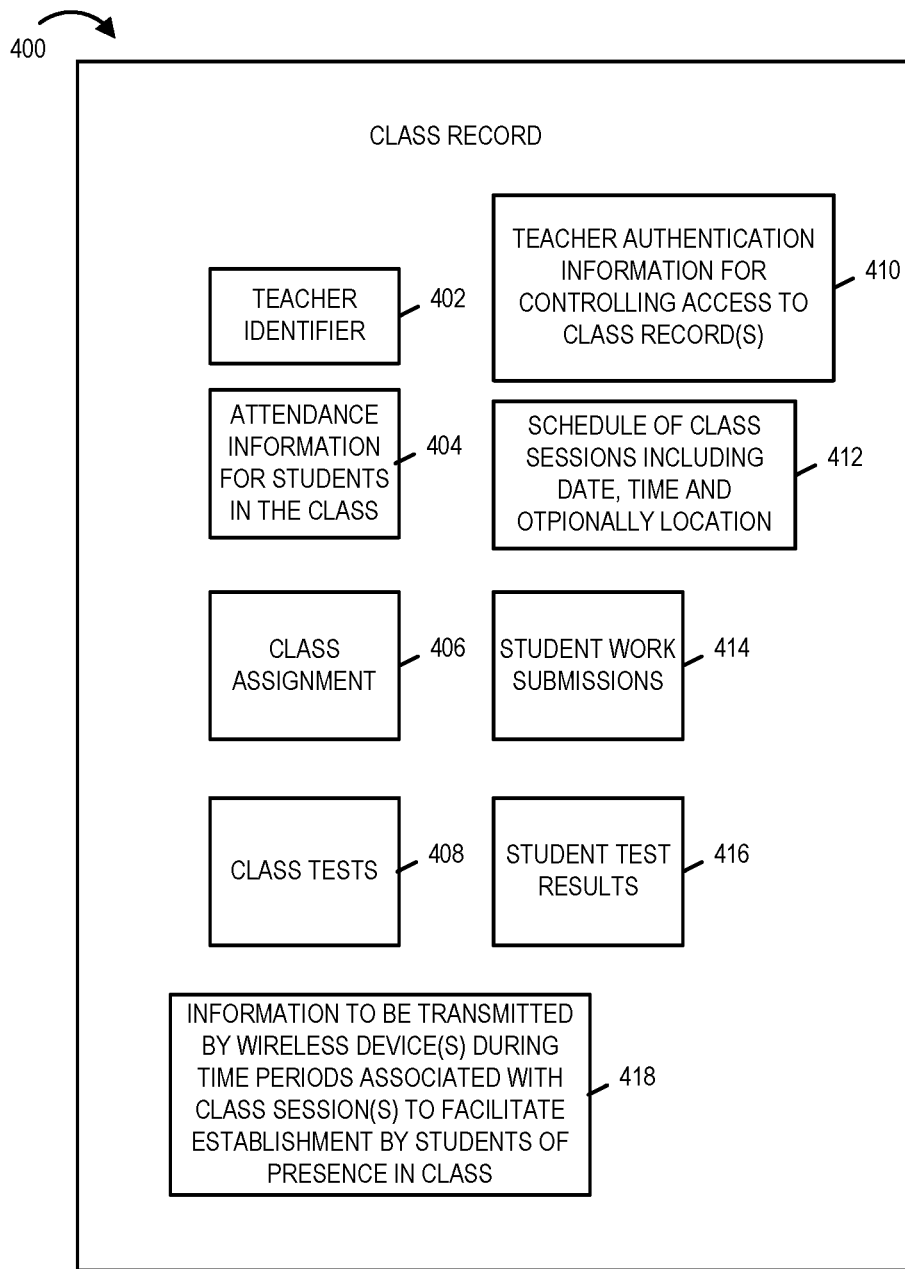
FIG. 4 illustrates and exemplary class record which may be stored, accessed and used by the network node, e.g., school server, shown in FIG. 1.

FIG. 4 is a drawing of exemplary class record 400 in accordance with an exemplary embodiment. Exemplary class record 400 includes a teacher identifier 402, attendance information for students in the class 404, class assignments 406, class tests 408, teach authentication information for controlling access to class record(s) 410, a schedule of class sessions including date, time and optionally location 412, student work submissions 414, student test results 416 and information 418 to be transmitted by wireless device(s) during time periods associated with class session(s) to facilitate establishment by students of presence in the class.

Figure 5:
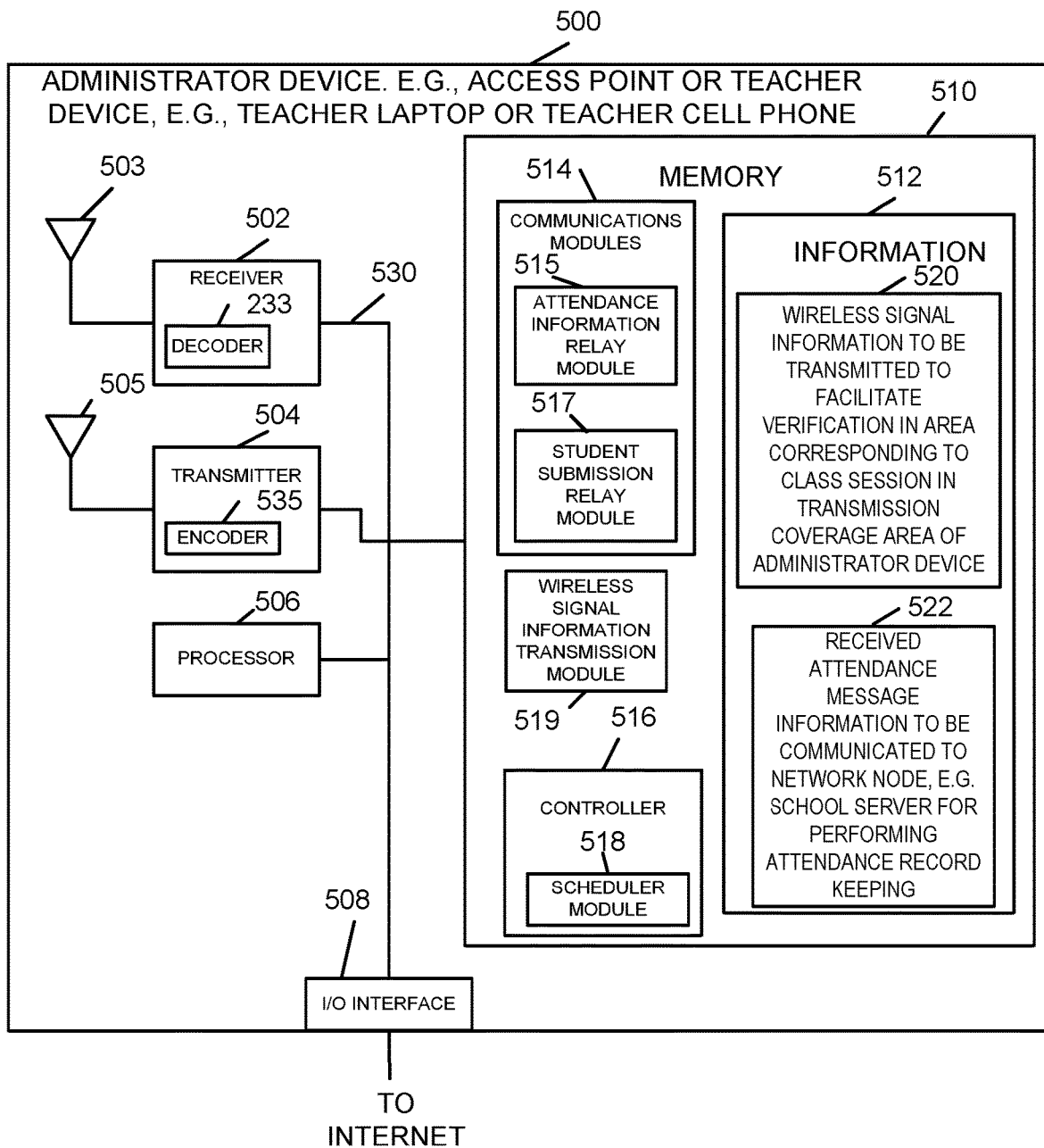
FIG. 5 illustrates an exemplary administrator device that can be used as a teacher device or access point of the system shown in FIG. 1.

FIG. 5 is a drawing of an exemplary administrator device 500, e.g., an access point or teacher device, e.g., a teacher laptop or teacher cell phone, in accordance with an exemplary embodiment. Administrator device 500 includes a receiver 502, a transmitter 504, a processor 506, e.g., a CPU, an I/O interface 508 and memory 510 coupled together via a bus 530 over which the various elements may exchange data and information. Receiver 502 is coupled to receive antenna 503 via which the administrator device 500 may receive wireless signals, e.g., wireless signals from students in a classroom. Receiver 502 includes a decoder 533 configured to decode received wireless signals and recover the information included in the wireless signals, e.g., attendance messages, student submission messages, student work assignment submission, student test result submission etc. Transmitter 504 includes an encoder 535 configured to encode information to be transmitted, e.g., information 520 to be transmitted by device 500 during time periods associated with class sessions to facilitate establishment by students of presence in the class. Transmitter 504 is coupled to transmit antenna 505 via which the administrator device 500 transmits wireless signals. Transmitted wireless signals short range wireless signals to students in the classroom during a class session.

Memory 514 includes communications modules 514 including an attendance information relay module 515 and a student submission relay module 519, a wireless signal information transmission module 519, a controller 516 including a scheduler module 518, and information 512. Information 512 includes wireless signal information 520 to be transmitted to facilitate verification in an area corresponding to a class session in transmission coverage area of the administrator device, e.g., during the class session. Information 512 further includes received attendance message information 522 to be communicated to a network node, e.g., a school server for performing attendance record keeping. Attendance information relay module 514 relays received attendance information received from students in the classroom to a network node, e.g., a school server supporting attendance record keeping. In some embodiments, attendance information relay module forwards a received individual attendance message which was received from students in the classroom to the network node, e.g., with the attendance information relay module 514 forwarding a plurality of messages, each message corresponding to an individual student. In some other embodiments, the attendance information relay module aggregates information received from multiple students in the class before forwarding the received attendance information to the network node, e.g., in an aggregated attendance message. Student submission relay module 512 forwards a received student submission message and a received corresponding work assignment student submission or test result student submission to a network node, e.g., a school server supporting record keeping of work assignments and test results.

Figure 6:
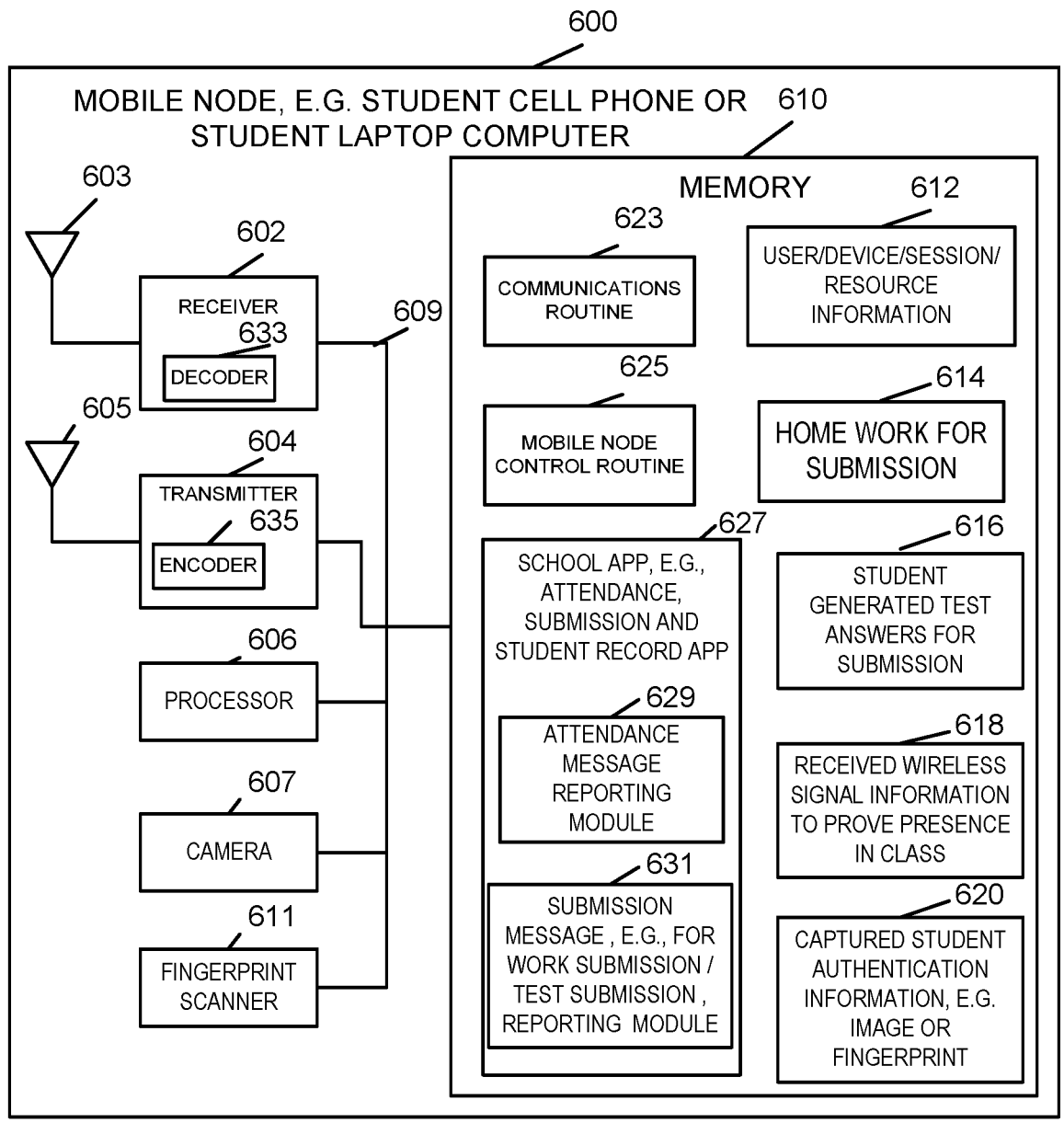
FIG. 6 illustrates an exemplary student device, e.g., cell phone or laptop computer, which can be used as a student device in the system of FIG. 1.

FIG. 6 is a drawing of an exemplary mobile node 600, e.g., a student cell phone or student laptop computer, in accordance with an exemplary embodiment. Exemplary mobile node 600 includes a receiver 602, a transmitter 604, a processor 606, a camera 607, a fingerprint scanner 611, and memory 610 coupled together via a bus 609 over which the various elements may exchange data and information. Receiver 602 includes a decoder 633 configured to decode received wireless signals. Receiver 602 is coupled to receive antenna 603 via which the mobile node 600 may receive wireless signals, e.g., wireless signals from an administrator device in a classroom in which the mobile device is located. Received wireless signals include, e.g., a received wireless signal communicating information to prove presence in class. Transmitter 604 includes an encoder 635 configured to encode information to be transmitted. Transmitter 604 is coupled to transmit antenna 605 via which the mobile node 600 transmits wireless signals, e.g., wireless signals to an administrator node, e.g., a teacher's laptop computer, a teacher's cell phone or an access node located in a classroom. Exemplary transmitted wireless signal include, e.g., a wireless signal communicating an attendance message, a wireless signal communicating a student submission message, a wireless signal communicating a work submission, e.g., homework information, a wireless signal communicating test results.

An image captured by camera 607, e.g., a self image of the student, e.g., student face image, with a corresponding date and time tag, may be, and in some embodiments, is used to authenticate a student, e.g., for attendance record keeping and/or for submission verification purposes. An fingerprint scan of a student's finger, captured by fingerprint scanner 611, with a corresponding date and time tag, may be, and in some embodiments, is used to authenticate a student, e.g., for attendance record keeping and/or for submission verification purposes.

Memory 610 includes a communications routine 623, a module node control routine 625, a school app 627, e.g., an attendance, submission and student record application. School app 627 includes an attendance message reporting module 629 and a submission message reporting module 631, e.g., for work submissions and test result submissions. Memory 610 further includes user/device/resource information 612, home work for submission 614, student generated test answers for submission 616, received wireless signal information to prove presence in class 618, e.g., identification information received from a broadcast beacon signal from a teacher device or an access point in the classroom in which the class session is occurring during the class session, and captured student authentication information, e.g., an image and/or a fingerprint of the student with date/time tag information.

Figure 7:
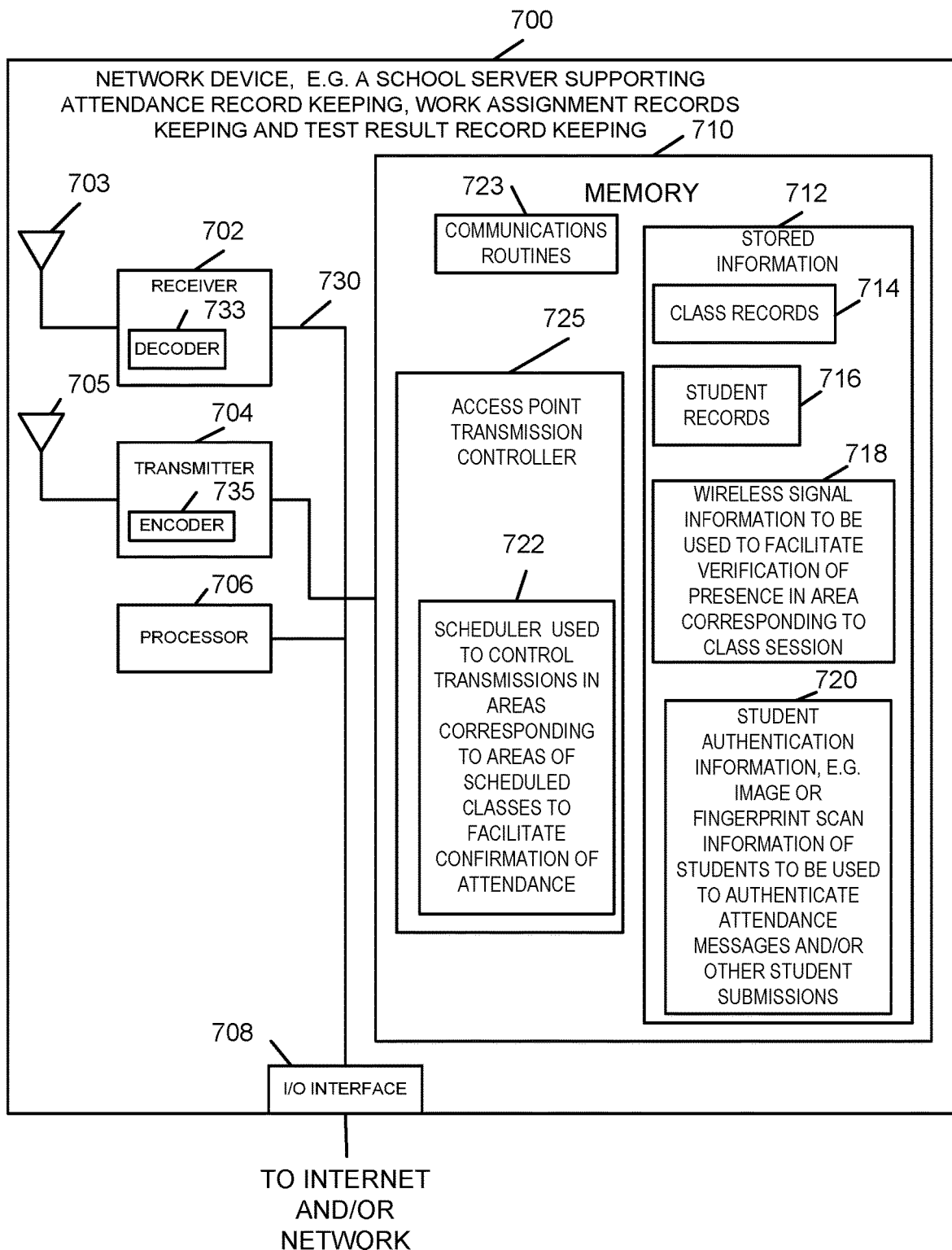
FIG. 7 illustrates an exemplary network node which can be used in the system of FIG. 1.

FIG. 7 is a drawing of an exemplary network device 700, e.g., a school server supporting attendance record keeping, work assignment record keeping and test record keeping, in accordance with an exemplary embodiment. Network device 700 is, e.g., network device 116 of system 100 of FIG. 1. Network device 700 is, e.g., a network device implementing the method of flowchart 200 of FIG. 2.

Network device 700 includes a receiver 702, a transmitter 704, a processor 706, and I/O interface 708, and memory 710 coupled together via a bus 730 over which the various elements may exchange data and information. Receiver 702 includes a decoder 733 for decoding received wireless signals. Receiver 702 is coupled to receive antenna 703 via which the network device may receive wireless signals. Transmitter 704 includes an encoder 735 for encoding data and information into wireless signals to be transmitted. Transmitter 704 is coupled to transmit antenna 705 via which the network device 700 may transmit wireless signals. I/O interface 708 is coupled to the Internet and/or a communications network, e.g., network 114. In various embodiments, network device 700 communicates with access points, teacher devices, and/or student devices, via I/O interface 708. In some embodiments, network device 700 communicates indirectly, via interface 708, with student devices via an access point, e.g., a fixed access point in classroom, or via a mobile teacher device serving as an access point, e.g. in a classroom during a class session.

Processor 706, e.g., a CPU, executes routines and uses data/information in memory 710 to control operation of network device 700 and implement the steps of a method, e.g., the method of flowchart 200 of FIG. 2. Memory includes communications routines 723, an access point transmission controller 725 and stored information 712. Stored information 712 includes class records 714, student records 716, wireless signal information to be used to facilitate verification of presence in an area corresponding to a class session 718 and student authentication information 720, e.g., image or fingerprint scan information of students to be used to authenticate attendance messages and/or other student submissions. Access point controller 725 includes a schedule 722 used to control transmissions in areas corresponding to scheduled classes to facilitate confirmation of attendance. In various embodiments, access point controller 725 controls transmission of at least some signals, e.g., some identification signals, to be transmitted by administrator devices, e.g., an access point with a coverage area including a classroom corresponding to a scheduled class or a teacher device, e.g., a teacher laptop or teacher cell phone, corresponding to a scheduled class session, which may serve as an access point.

In some embodiments, class records 714 is class record 400 of FIG. 4. In some embodiments, student records 716 is student records 300 of FIG. 3.

Figure 8:
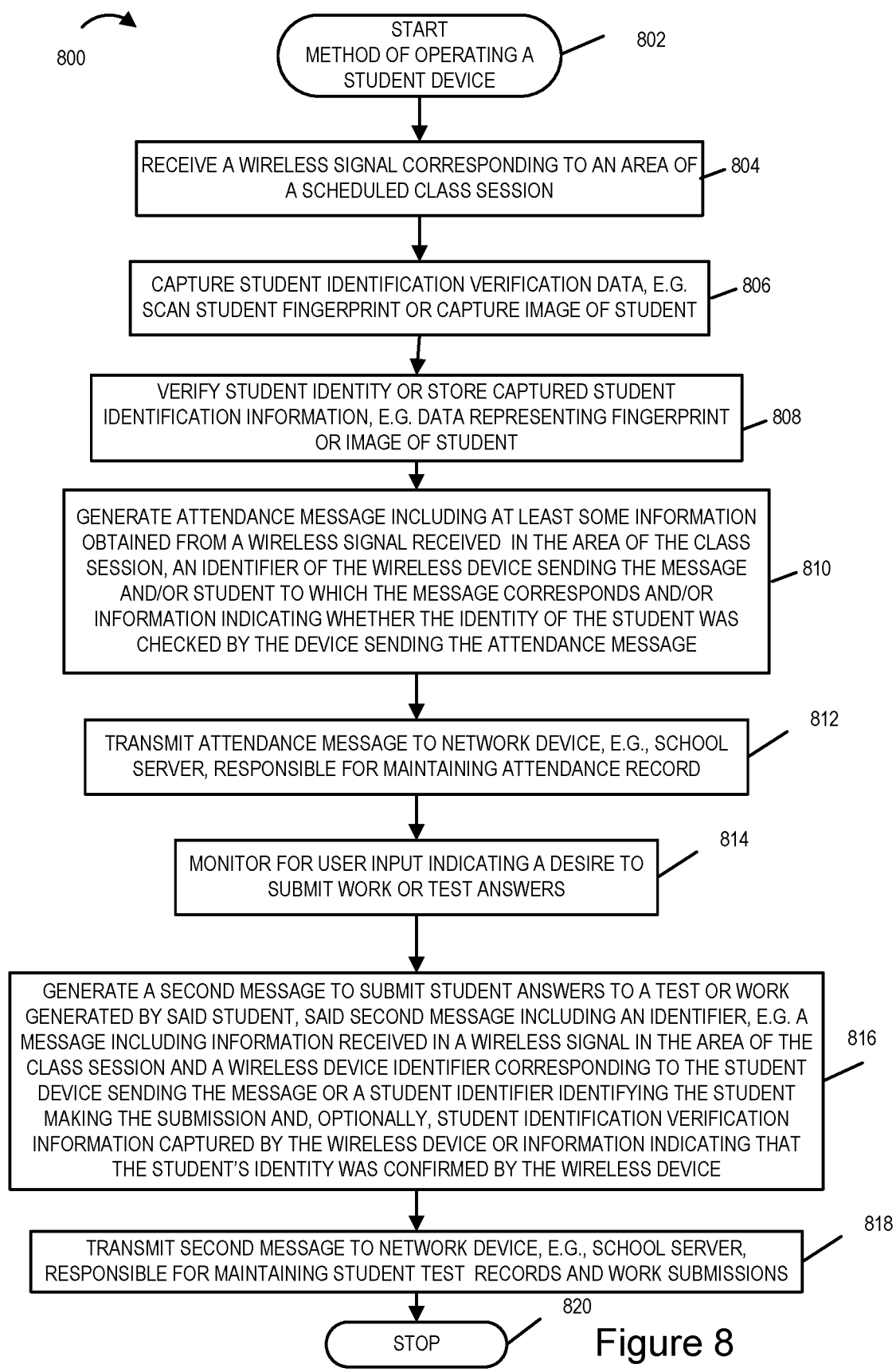
FIG. 8 is a flowchart 800 of an exemplary method of operating a student device

FIG. 8 is a flowchart 800 of an exemplary method of operating a student device, e.g., student device 110 of FIG. 1, student device N 112 of FIG. 1, and/or student device 600 of FIG. 6, in accordance with an exemplary embodiment. The student device implementing the method of flowchart 800 is, e.g., a mobile node, e.g., a student laptop computer or student cell phone. Operation of the exemplary method starts in step 802, in which the student device is powered on and initialized. Operation proceeds from start step 802 to step 804 in which the student device receives a wireless signal corresponding to an area of a scheduled class session. Operation proceeds from step 804 to step 806. In step 806 the student device captures student identification verification data, e.g., the student device captures a student fingerprint scan and/or captures an image of the student, e.g. an image of the student's face. Operation proceeds from step 806 to step 808.

In step 808 the student device verifies the student's identity or stores captured student identification information, e.g., data representing the fingerprint or image of the student. Operation proceeds from step 808 to step 810. In step 810 the student device generates an attendance message including at least some information obtained from a wireless signal received in the area of the class session, and identifier of the wireless device sending the messages and/or student to which the message corresponds and/or information indicating whether the identity of the student was checked by the device sending the attendance message. In some embodiments, the attendance message further includes data representing the captured student identification and date/time tag information corresponding to the capture time. Operation proceeds from step 810 to step 812.

In step 812 the student device transmits the generated attendance message to the network device, e.g., school server, responsible for maintaining the attendance record. Operation proceeds from step 812 to step 814.

In step 814 the student device monitors for user input indicating a desire to submit work or test answers. Operation proceeds from step 814 to step 816.

In step 816 the student device generates a second message to submit student answers to a test or work generated by said student, said second message including an identifier, e.g., a messaging including information received in a wireless signal in the area of the class session and a wireless device identifier corresponding to the student device sensing the message or a student identifier identifying the student making the submission and, optionally, student identification verification information captured by the wireless device or information indicating that the student's identify was confirmed by the wireless device. Operation proceeds from step 816 to step 818.

In step 818 the student device transmits the second message to the network device, e.g., a school server, responsible for maintain student test results and work submissions. Operation proceeds from step 818 to stop step 820.

In some embodiments, the generated first and second messages are sent to the network device, e.g., a school server, via an access point in the vicinity of the classroom in which the class session, e.g., a fixed access point in the classroom or a teacher device serving as a temporary access point for the students during the class session.

LIST OF EXEMPLARY NUMBERED METHODS AND EMBODIMENTS

1. A method of providing information, comprising:
storing, in a storage device, accessible to a network device, class information corresponding to a class, said class information including: i) wireless signal information associated with said class and ii) student information; and
receiving, at the network device, a first message including at least one of: i) information received at a student device in a wireless signal transmitted from a wireless transmitter of an administrator device or ii) information received in a wireless signal transmitted from a student device and received by the administrator device.

2. The method of numbered method 1, wherein the administrator device is one of an access point corresponding to a classroom where said class is conducted or a teacher device of a teacher of said class, wherein said teacher device is a wireless device.
2A. The method of numbered method 2, wherein said teacher device is one of a cell phone or a laptop.
3. The method of numbered method 2, wherein said wireless signal information includes:
   per student wireless signal identification information, said per student wireless signal identification information including for at least a first student:
      first student wireless signal identification information which includes information that can be used to identify a wireless signal transmitted by a first student device corresponding to the first student; and
4. The method of numbered method 3, wherein said student information includes: per student information including for at least a first student:
   first student identification information corresponding to said first student for which first student wireless signal identification is stored, said student identification information including at least a first student name or first student identifier corresponding to the first student.
4A. The method of numbered method 4, wherein the per student information for the first student further includes:
   first student authentication information for authenticating at least one of first student identification information communicated via the first student's wireless device or first student submissions communicated via the first student's wireless device.
4B. The method of numbered method 3, wherein the per student information for the first student further includes, per student class records including a first student class record for said first class including:
   student attendance information indicating one or more dates of attendance by the first student in the first class.
5. The method of numbered method 4B, wherein said first student class record for said first class further includes:
   a first student work submission for the first class; and
   time and date information indicating the time and date the first student work submission was submitted by the first student for the first class.
6. The method of numbered method 5, wherein said first student class record for said first class further includes:
   a first student work submission for the first class; and
   time and date information indicating the time and date the first student work submission was submitted by the first student for the first class.
7. The method of numbered method 6, wherein said first student class record for said first class further includes:
   a first student test submission for the first class; and
   time and date information indicating the time and date the first student test submission was submitted by the first student for the first class.
8. The method of numbered method 1, wherein the first message is a class attendance message from a first student device, said first message including at least a portion of information included in wireless signal received by the first student device.
9. The method of numbered method 1, further comprising:
   determining if the first message includes information satisfying location and time constraints required to establish attendance in a session of the first class; and
   if is determined that the first message includes information satisfying location and time constraints required to establish attendance in a session of the first class, updating the attendance record of the student corresponding to the wireless device from which the first message was received.
10. The method of numbered method 1, further comprising:
   receiving a second message from a student device, said second message communicating a student submission; and
   determining if the student submission was to be submitted during a class session;
   and when it is determined that the student submission was to be submitted during a class session, checking to determine if information from a wireless signal transmitted from a wireless transmitter of an administrator device during said class session to which the student submission corresponds was received from the student device transmitting the second message.
11. The method of numbered method 10, further comprising:
   rejecting the student submission if said check determines that the information from a wireless signal transmitted from the wireless transmitter of the administrator device during said class session was not received; and
   updating the student record, corresponding to the student making the submission using the second message, when said check determines that the information from the wireless signal transmitted from the wireless transmitter of the administrator device during said class session was received.
12. The method of numbered method 11, wherein said submission is one of a work assignment corresponding to the class session or student test results corresponding to a class test to be taken during said class session.
13. The method of numbered method 11, further comprising:
   determining if said submission was made in a time period corresponding to the class session in which said submission was to be made; and
   rejecting said submission if said submission was made outside the time period corresponding to the class session in which said submission was to be made.
14. A network device, comprising:
   a storage device for storing class information corresponding to a class, said class information including: i) wireless signal information associated with said class and ii) student information; and
   an interface for receiving, at the network device, a first message including at least one of: i) information received at a student device in a wireless signal transmitted from a wireless transmitter of an administrator device or ii) information received in a wireless signal transmitted from a student device and received by the administrator device.
15. The network device of numbered embodiment 14, wherein the administrator device is one of an access point corresponding to a classroom where said class is conducted or a teacher device of a teacher of said class, said teach device being a wireless device.
15A. The network device of numbered embodiment 15, wherein said teacher device is one of a cell phone or a laptop.
16. The network device of numbered embodiment 15, wherein said wireless signal information includes:

per student wireless signal identification information, said per student wireless signal identification information including for at least a first student:
first student wireless signal identification information which includes information that can be used to identify a wireless signal transmitted by a first student device corresponding to the first student; and 16A. The network device of numbered embodiment 16, wherein said student information includes: per student information including for at least a first student:
first student identification information corresponding to said first student for which first student wireless signal identification is stored, said student identification information including at least a first student name or first student identifier corresponding to the first student.

16B. The network device of numbered embodiment 16A, wherein the per student information for the first student further includes:
first student authentication information for authenticating at least one of first student identification information communicated via the first student's wireless device or first student submissions communicated via the first student's wireless device.

16C. The network device of numbered embodiment 16, wherein the per student information for the first student further includes, per student class records including a first student class record for said first class including:
student attendance information indicating one or more dates of attendance by the first student in the first class.

16D. The network device of numbered embodiment 16C, wherein said first student class record for said first class further includes:
a first student work submission for the first class; and
time and date information indicating the time and date the first student work submission was submitted by the first student for the first class.

16E. The network device of numbered embodiment 16D, wherein said first student class record for said first class further includes:
a first student work submission for the first class; and
time and date information indicating the time and date the first student work submission was submitted by the first student for the first class.

16F. The network device of numbered embodiment 16E, wherein said first student class record for said first class further includes:
a first student test submission for the first class; and
time and date information indicating the time and date the first student test submission was submitted by the first student for the first class.

17. The network device of numbered embodiment 14, wherein the first message is a class attendance message from a first student device, said first message including at least a portion of information included in wireless signal received by the first student device.

18. The network device of numbered embodiment 14, further comprising:
a processor configured to control the network device to:
determine if the first message includes information satisfying location and time constraints required to establish attendance in a session of the first class; and
update, if is determined that the first message includes information satisfying location and time constraints required to establish attendance in a session of the first class, the attendance record of the student corresponding to the wireless device from which the first message was received.

19. The network device of numbered embodiment 18, wherein the interface is further configured to receive a second message from a student device, said second message communicating a student submission; and
wherein the processor is further configured to:
determine if the student submission was to be submitted during a class session;
and check, when it is determined that the student submission was to be submitted during a class session, to determine if information from a wireless signal transmitted from a wireless transmitter of an administrator device during said class session to which the student submission corresponds was received from the student device transmitting the second message.

20. The network of numbered embodiment 19, wherein the processor is further configured to:
reject the student submission if said check determines that the information from a wireless signal transmitted from the wireless transmitter of the administrator device during said class session was not received; and
update the student record, corresponding to the student making the submission using the second message, when said check determines that the information from the wireless signal transmitted from the wireless transmitter of the administrator device during said class session was received.

21. The network device of numbered embodiment 20, wherein said submission is one of a work assignment corresponding to the class session or student test results corresponding to a class test to be taken during said class session.

22. The network device of numbered embodiment 20, wherein the processor is further configured to:
determine if said submission was made in a time period corresponding to the class session in which said submission was to be made; and
reject said submission if said submission was made outside the time period corresponding to the class session in which said submission was to be made.

23. The network device of numbered embodiment 20, wherein the processor is further configured to:
determine if said submission from a device which checked the identity of the student corresponding to the student device from which the submission is made or to check the identity of the student based on information captured by the student device from which the submission is received; and
reject said submission if the identity of the student was not successfully checked by one of the student device or by the network device.

The methods and apparatus of the present invention are applicable to a wide range of communications systems which transmit signals, e.g., beacons signals including WiFi, Bluetooth, cellular and/or non-cellular systems.

In various embodiments nodes described herein are implemented using one or more modules to perform the steps corresponding to one or more methods of the present invention, for example, signal reception, signal processing, a determinations, message generation and/or transmission steps. Thus, in some embodiments various features of the present invention are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, the present invention is directed to a machine-readable medium including machine executable instructions for causing a machine, e.g., processor and associated hardware, to perform one or more of the steps of the above-described method(s)

Numerous additional variations on the methods and apparatus of the present invention described above will be apparent to those skilled in the art in view of the above description of the invention. Such variations are to be considered within the scope of the invention. The methods and apparatus of the present invention may be, and in various embodiments are, used with CDMA, orthogonal frequency division multiplexing (OFDM), and/or various other types of communications techniques which may be used to provide wireless communications links between access nodes and mobile nodes and/or between beacon transmitters and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of the present invention Some embodiments are directed a non-transitory computer readable medium embodying a set of software instructions, e.g., computer executable instructions, for controlling a computer or other device to communicate information.

The techniques of various embodiments may be implemented using software, hardware and/or a combination of software and hardware. Various embodiments are directed to apparatus, e.g., a server such as an emergency management server. Various embodiments are also directed to methods, e.g., a method of providing emergency related information. Various embodiments are also directed to a non-transitory machine, e.g., computer, readable medium, e.g., ROM, RAM, CDs, hard discs, etc., which include machine readable instructions for controlling a machine to implement one or more steps of a method.

As discussed above various features of the present invention are implemented using modules. Such modules may, and in some embodiments are, implemented as software modules. In other embodiments the modules are implemented in hardware. In still other embodiments the modules are implemented using a combination of software and hardware. In some embodiments the modules are implemented as individual circuits with each module being implemented as a circuit for performing the function to which the module corresponds. A wide variety of embodiments are contemplated including some embodiments where different modules are implemented differently, e.g., some in hardware, some in software, and some using a combination of hardware and software. It should also be noted that routines and/or subroutines, or some of the steps performed by such routines, may be implemented in dedicated hardware as opposed to software executed on a general purpose processor. Such embodiments remain within the scope of the present invention. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods. Accordingly, among other things, the present invention is directed to a machine-readable medium including machine executable instructions for causing a machine, e.g., processor and associated hardware, to perform one or more of the steps of the above-described method(s).

The techniques of the present invention may be implemented using software, hardware and/or a combination of software and hardware. The present invention is directed to apparatus, e.g., a server, a beacon transmitter, mobile nodes such as mobile terminals, non-management user devices, management person user devices, base stations, and a communications system which implement the present invention. It is also directed to methods, e.g., method of controlling and/or operating a server, a beacon transmitters, mobile nodes including user devices, base stations and/or communications systems, e.g., hosts, in accordance with the present invention. The present invention is also directed to machine readable medium, e.g., ROM, RAM, CDs, hard discs, etc., which include machine readable instructions for controlling a machine to implement one or more steps in accordance with the present invention.

Numerous additional variations on the methods and apparatus of the various embodiments described above will be apparent to those skilled in the art in view of the above description. Such variations are to be considered within the scope.

What is claimed is:

1. A method of providing information, comprising:
storing, in a storage device, accessible to a network device, class information corresponding to a class, said class information including: i) wireless signal information associated with said class and ii) student information;
receiving, at the network device, a first message from a student device, said first message including at least a time dependent identifier that was received at the student device in a wireless signal transmitted from a wireless transmitter of an administrator device;
receiving a second message from the student device, said second message communicating a student submission;
determining if the student submission was to be submitted during a class session; and
checking, when it is determined that the student submission was to be submitted during the class session, to determine if the second message includes a time dependent identifier that was transmitted from the wireless transmitter of the administrator device during the class session during which the student submission was to be submitted.

2. The method of claim 1, wherein the administrator device is one of an access point corresponding to a classroom where said class is conducted or a teacher device of a teacher of said class, wherein said teacher device is a wireless device.

3. The method of claim 2,
wherein the time dependent identifier is a time dependent class identifier; and
wherein said first message further includes:
authentication information, said authentication information including at least one of i) biometric information captured by a thumb or other finger scan or ii) an image of the student captured by the student device during the time associated with a class session; and student wireless signal identification information, said student wireless signal identification information including for at least a first student:

first student wireless signal identification information which includes information that can be used to identify a wireless signal transmitted by a first student device corresponding to the first student.

4. The method of claim 3, further comprising:

storing in said storage device student information corresponding to the first student, said student information corresponding to the first student including:

first student identification information corresponding to said first student for which first student wireless signal identification is stored, said first student identification information including at least a first student name or first student identifier corresponding to the first student.

5. The method of claim 4, wherein the student information corresponding to the first student further includes:

student attendance information indicating one or more dates of attendance by the first student in a first class.

6. The method of claim 5, wherein the student information corresponding to the first student further includes:

a first student work submission for the first class; and time and date information indicating the time and date the first student work submission was submitted by the first student for the first class.

7. The method of claim 5, wherein the student information corresponding to the first student further includes:

a first student test submission for the first class; and time and date information indicating the time and date the first student test submission was submitted by the first student for the first class.

8. The method of claim 1, wherein the first message is a class attendance message from a first student device, said first message including at least a portion of information included in a wireless signal received by the first student device.

9. The method of claim 1, further comprising:

determining if the first message includes information satisfying location and time constraints required to establish attendance in a session of a first class; and if it is determined that the first message includes information satisfying location and time constraints required to establish attendance in a session of the first class, updating an attendance record of the student corresponding to the wireless device from which the first message was received.

10. The method of claim 1, further comprising:

rejecting the student submission if said check determines that the second message does not include the time dependent identifier that was transmitted from the wireless transmitter of the administrator device during the class session during which the student submission was to be submitted; and updating the student record, corresponding to the student making the submission using the second message, when said check determines that the second message includes the time dependent identifier that was transmitted from the wireless transmitter of the administrator device during the class session during which the student submission was to be submitted.

11. The method of claim 10, wherein said student submission is one of a work assignment corresponding to the class session or student test results corresponding to a class test to be taken during said class session.

12. The method of claim 10, further comprising:

determining if said student submission was made in a time period corresponding to the class session in which said student submission was to be made; and rejecting said student submission if said student submission was made outside the time period corresponding to the class session in which said student submission was to be made.

13. A network device, comprising:

a storage device for storing class information corresponding to a class, said class information including: i) wireless signal information associated with said class and ii) student information;

an interface configured to receive a first message from a student device, said first message including at least a time dependent identifier that was received at the student device in a wireless signal transmitted from a wireless transmitter of an administrator device;

wherein the interface is further configured to receive a second message from a student device, said second message communicating a student submission; and a processor configured to control the network device to:

determine if the student submission was to be submitted during a class session; and check, when it is determined that the student submission was to be submitted during the class session, to determine if information from a wireless signal transmitted from the wireless transmitter of an administrator device during the class session to which the student submission corresponds was received from the student device transmitting the second message.

14. The network device of claim 13, wherein the administrator device is one of an access point corresponding to a classroom where said class is conducted or a teacher device of a teacher of said class, said teacher device being a wireless device.

15. The network device of claim 14, wherein said time dependent identifier is a secure time dependent class identifier; and wherein said wireless signal information includes:

per student wireless signal identification information, said per student wireless signal identification information including for at least a first student:

first student wireless signal identification information which includes information that can be used to identify a wireless signal transmitted by a first student device corresponding to the first student; and first student identification information corresponding to said first student for which first student wireless signal identification is stored, said first student identification information including at least a first student name or first student identifier corresponding to the first student.

16. The network device of claim 13, wherein said processor is further configured to control the network device to:

determine if the first message includes information satisfying location and time constraints required to establish attendance in a session of the class; and update, if it is determined that the first message includes information satisfying location and time constraints required to establish attendance in a session of the class, the an attendance record of the student corresponding to the wireless device from which the first message was received.

17. The network device of claim 13, wherein the processor is further configured to:
- reject the student submission if said check determines that the information from a wireless signal transmitted from the wireless transmitter of the administrator device during said class session to which the student submission corresponds was not received from the student device transmitting the second message; and
- update a student record, corresponding to the student making the submission using the second message, when said check determines that the information from the wireless signal transmitted from the wireless transmitter of the administrator device during said class session to which the student submission corresponds was received from the student device transmitting the second message.

18. A non-transitory computer readable medium comprising computer executable instructions which when executed by a processor of a network node control the network node to perform the steps of:
- store, in a storage device, accessible to the network node, class information corresponding to a class, said class information including: i) wireless signal information associated with said class and ii) student information;
- receive, at the network node, a first message from a student device, said first message including at least a time dependent identifier that was received at the student device in a wireless signal transmitted from a wireless transmitter of an administrator device;
- receive a second message from the student device, said second message communicating a student submission;
- determine if the student submission was to be submitted during a class session; and
- check, when it is determined that the student submission was to be submitted during the class session, to determine if the second message includes a time dependent identifier that was transmitted from the wireless transmitter of the administrator device during the class session during which the student submission was to be submitted.

* * * * *